United States Patent [19]

Hibi

[11] Patent Number: 5,243,420
[45] Date of Patent: Sep. 7, 1993

[54] IMAGE ENCODING AND DECODING APPARATUS USING QUANTIZED TRANSFORM COEFFICIENTS TRANSFORMED ORTHOGONALLY

[75] Inventor: Keiichi Hibi, Kashiwa, Japan

[73] Assignee: Sharp Kabushiki Kaisha, Osaka, Japan

[21] Appl. No.: 750,574

[22] Filed: Aug. 28, 1991

[30] Foreign Application Priority Data

Aug. 30, 1990 [JP] Japan .................. 2-231670
Aug. 26, 1991 [JP] Japan .................. 3-213562

[51] Int. Cl.⁵ .............................. H04N 7/13
[52] U.S. Cl. ..................... 358/136; 358/135
[58] Field of Search .................. 358/136, 135

[56] References Cited

U.S. PATENT DOCUMENTS

| | | | |
|---|---|---|---|
| 4,723,161 | 2/1988 | Kaga | 358/136 |
| 4,933,761 | 6/1990 | Murakami et al. | 358/136 X |
| 5,025,482 | 6/1991 | Murakami et al. | 358/136 X |
| 5,113,255 | 5/1992 | Nagata et al. | 358/105 X |

Primary Examiner—Victor R. Kostak
Attorney, Agent, or Firm—David G. Conlin; George W. Neuner

[57] ABSTRACT

An image encoding apparatus which is capable of keeping a quality of an encoded image even though a part of information is lost on a communication network, includes a unit (36) for quantizing transform coefficients and for outputting a quantized output signal and a quantized error signal, a unit (37) connected to the quantizing unit (37) for controlling a quantizing level used in the quantizing unit (37) so that the transform coefficients are quantized in accordance with the controlled quantizing level, an error quantizing unit (38) connected to the quantizing unit (36) for quantizing the quantized error signal output from the quantizing unit (36), and an error encoding control unit (39) connected to the error quantizing unit (38) for controlling a requantizing level used in the error quantizing unit (38) so that the quantized error signal is requantized in accordance with the controlled requantizing level.

11 Claims, 13 Drawing Sheets

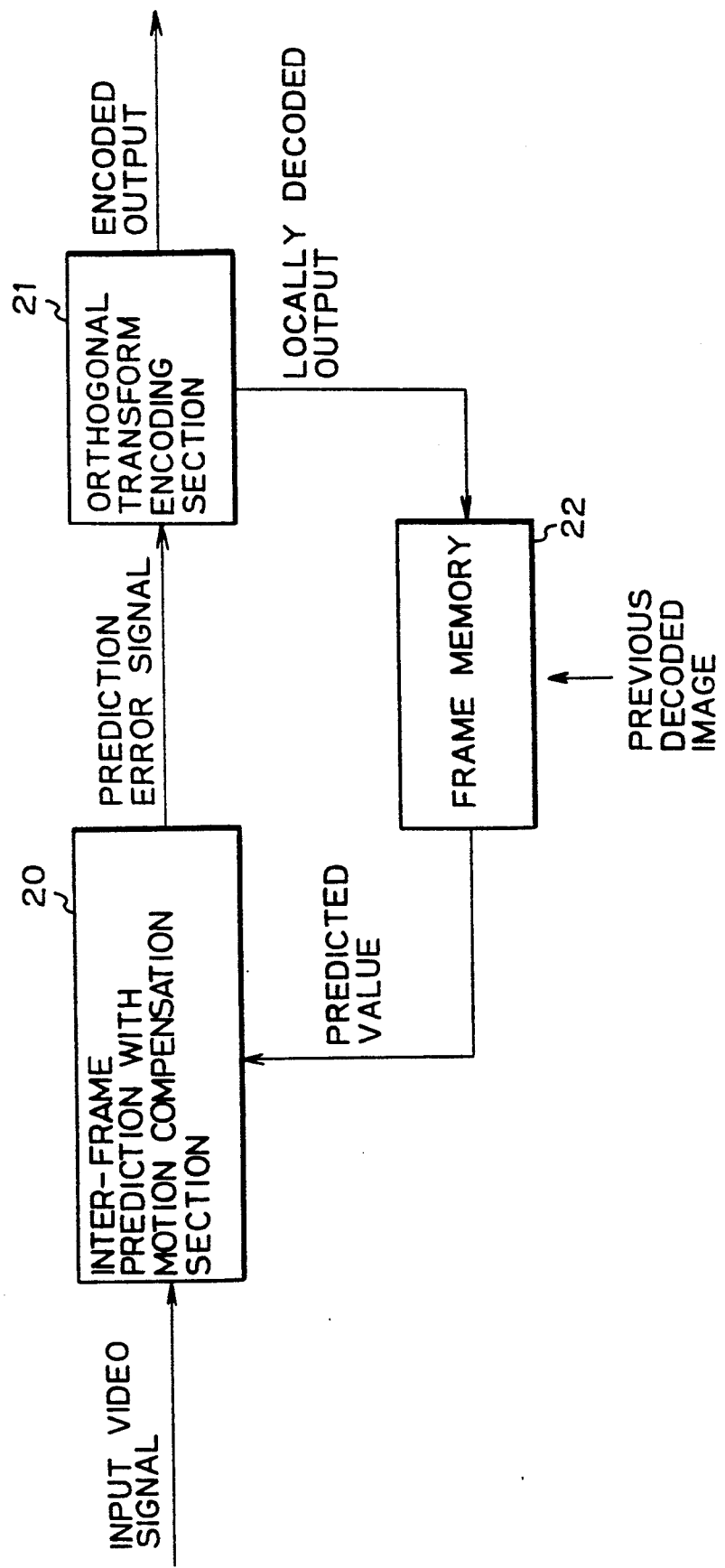

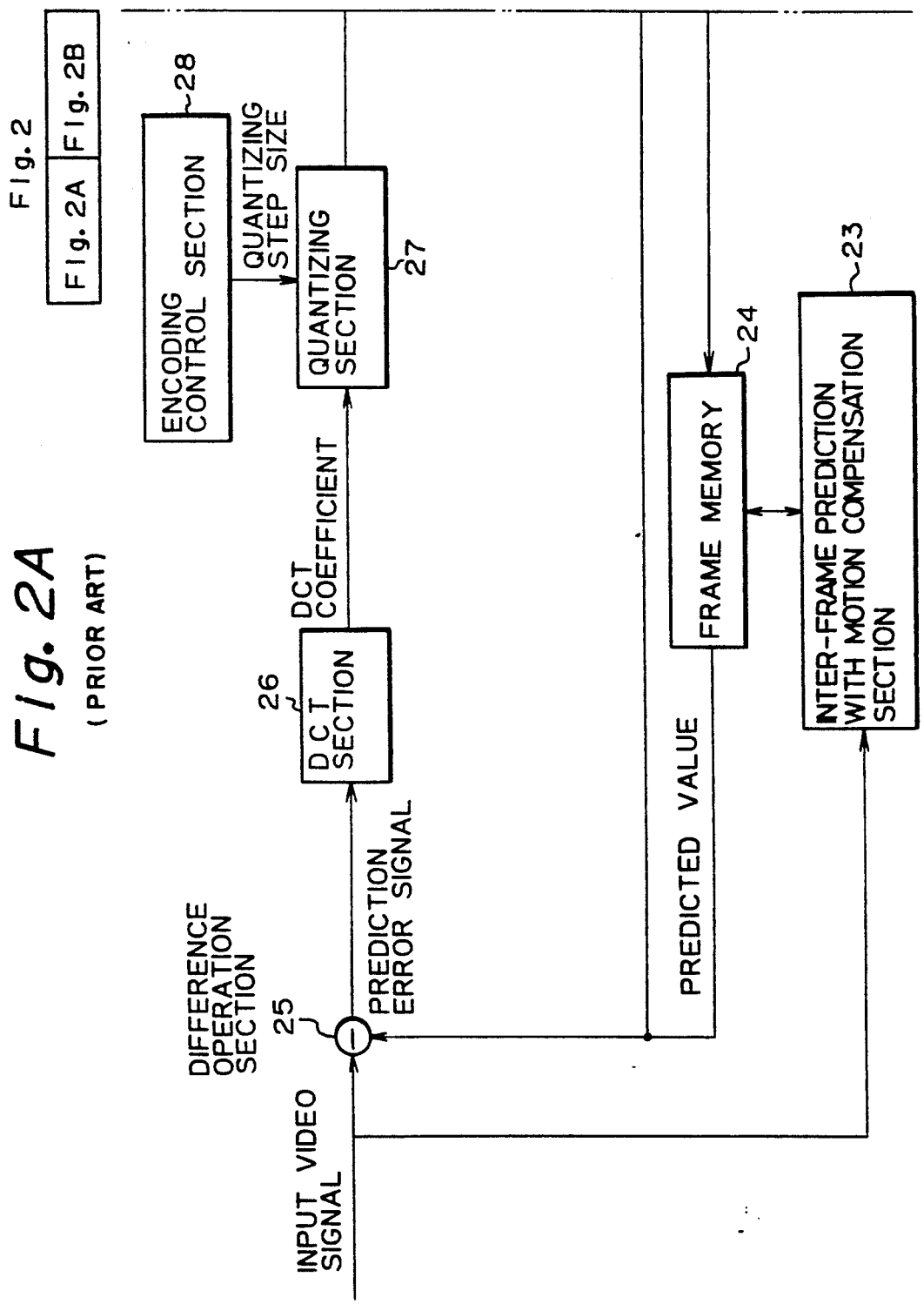

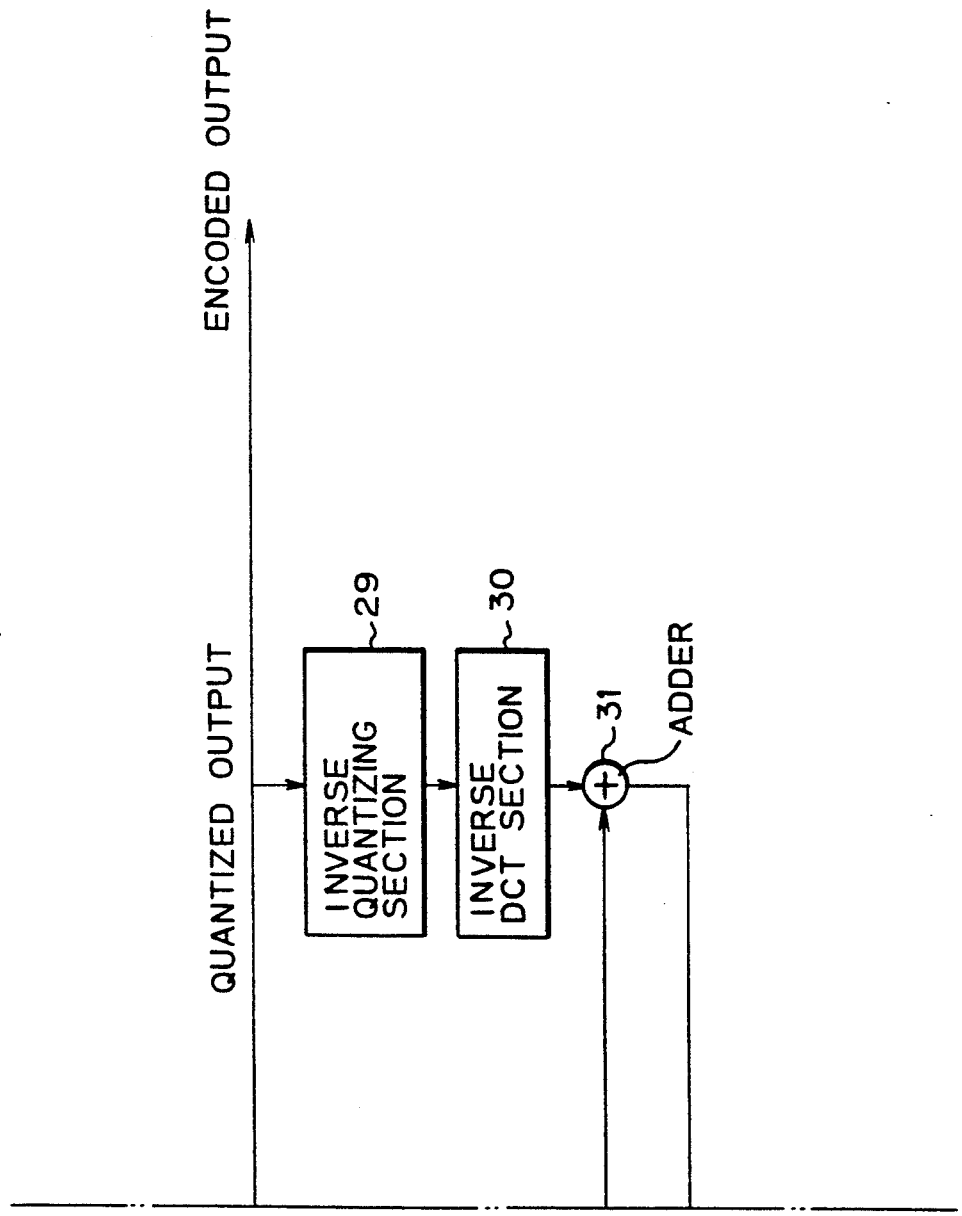

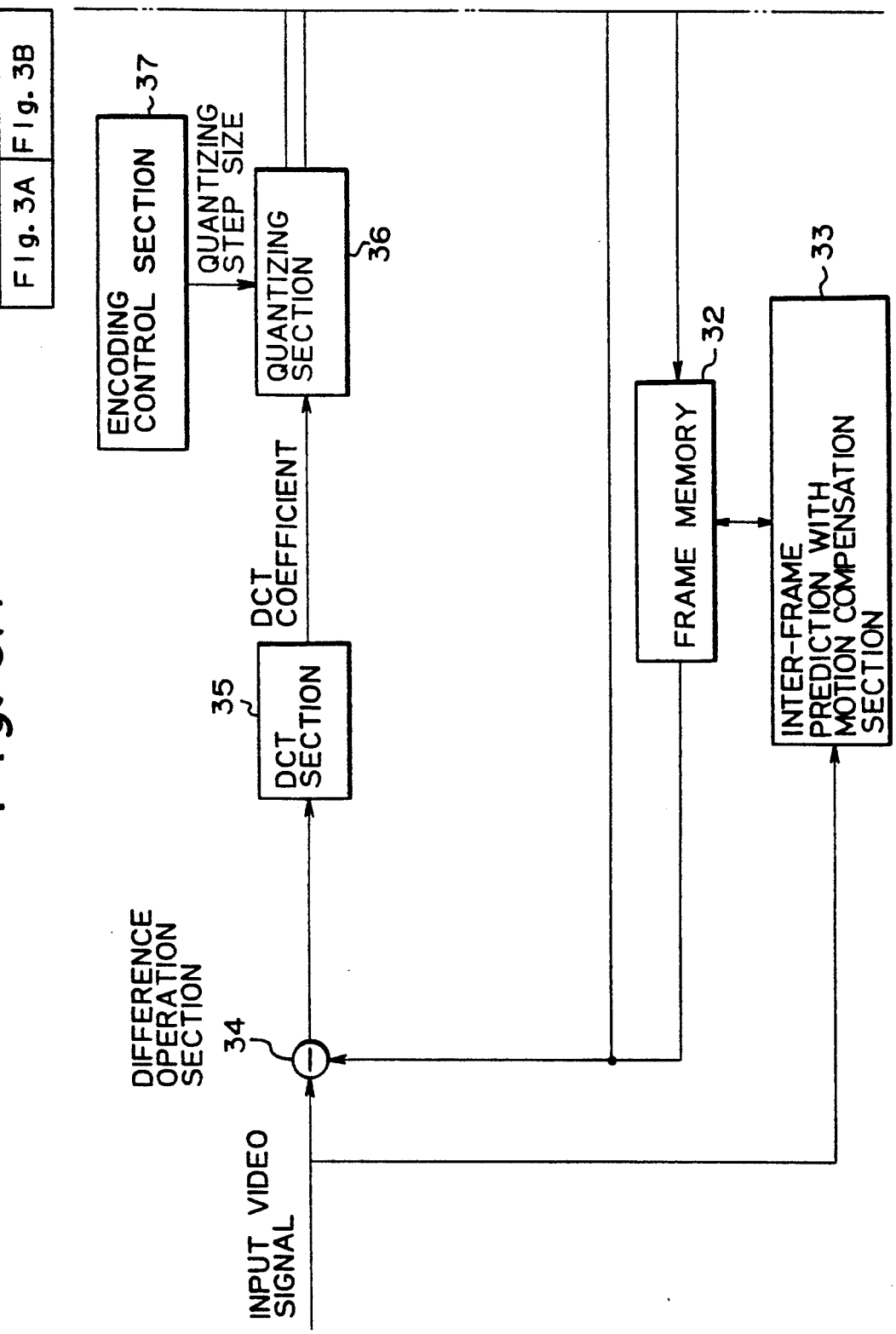

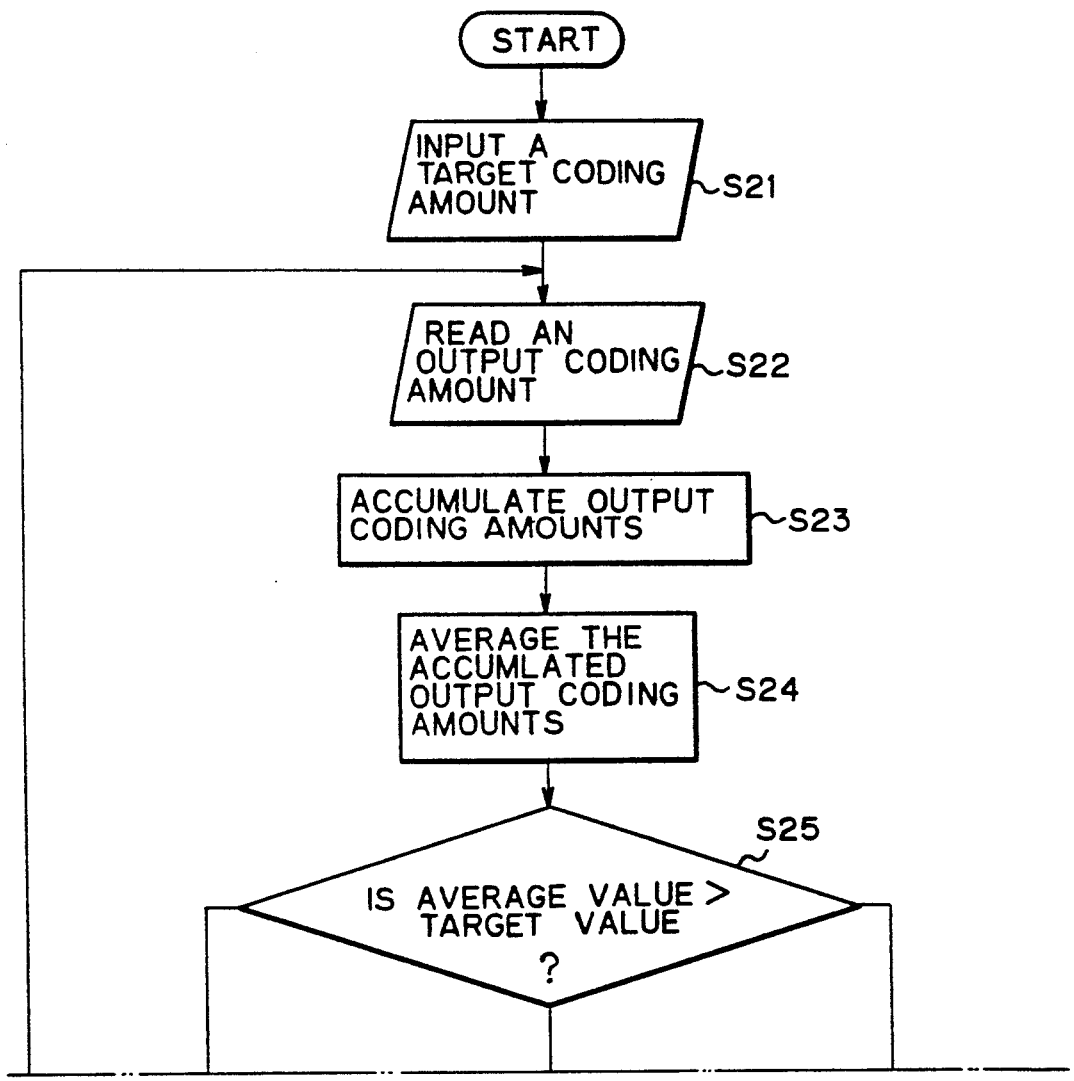

IMAGE ENCODING AND DECODING APPARATUS USING QUANTIZED TRANSFORM COEFFICIENTS TRANSFORMED ORTHOGONALLY

BACKGROUND OF THE INVENTION

1. Field of the Invention

The present invention relates to an image encoding apparatus which is capable of reducing the amount of information contained in an input signal and capable of a prediction encoding of the input signal for producing a signal adapted to transmit an image through a communication line. The present invention also relates to an image decoding apparatus which is capable of reproducing the image transmitted through the communication line from the image encoding apparatus.

2. Description of the Related Art

As a recent provision and a spread of a digital transmission network, a progress in an image processing technique and a development of a high-speed digital signal processing technique demands for realizing the video communication service have risen as new communication service.

In the video communication services, Videophone service, TV conference service have been provided, and those services are advancing toward the implementation with an aid of a high-functional network like ISDN (Integrated Service Digital Network). For higher communication service, a new communication network such as B-ISDN (Broad band-Integrated Service Digital Network) is now under active consideration. In another field rather than the communication, a new system is expected for efficiently treating the image information (image media).

In general, the image information contains so much information that it requires a wide-band transmission network in case a video signal is directly transmitted through a communication line without changing the video signal to an adaptive form. Hence, the direct transmission of the video signal is not realistic. The video signal, however, includes redundant information. The use of redundancy makes it possible to reduce the amount of information contained in the video signal. Hence, the image encoding (compressing) technique is widely used for efficiently treating the video signal.

Such an image encoding system has been actively considered in the field of communication, in particular, the transmission of a video signal. It results in yielding various proposals. Of those proposed image encoding systems, the present inventors know that an inter-frame prediction with motion compensation orthogonal transform encoding system can provide the highest encoding efficiency and is often used in recent days.

FIG. 1 shows the principle on which the inter-frame prediction with motion compensation orthogonal transform encoding system operates. The input video signal contains time information, for example motion contained in the image and spatial information about the content of one image frame. Both pieces of information provide redundancies. Then, the inter-frame prediction with motion compensation section 20 serves to remove the time redundancy from the input video signal. The resulting signal is sent to an orthogonal transform encoding section 21 in which the spatial redundancy is removed from the received signal. The video signal encoded in the orthogonal transform encoding section 21 is locally decoded and output to a frame memory section 22 in which the locally decoded signal is stored. This stored signal is used for inter-frame prediction of a next image frame. That is, the inter-frame prediction with motion compensation section 20, the orthogonal transform encoding section 21, and the frame memory section 22 form a loop referred to as an encoding loop.

The inventors of the present invention know that an image encoding apparatus includes the inter-frame prediction with motion compensation orthogonal transform encoding system operating on the foregoing known motion as shonw in FIG. 2 which is composed of FIGS. 2A and 2B.

The above-mentioned known image encoding apparatus includes an inter-frame prediction with motion compensation section 23, a frame memory section 24, a difference operating section 25, a DCT section 26, a quantizing section 27, an encoding control section 28, a dequantizing section 29, an inverse DCT section 30, and an adder 31.

Those components compose a loop through which a video signal travels in the describing order. At first, the input video signal is sent to the inter-frame prediction with motion compensation section 23 which serves to encode the input video signal at each image frame. That is, the inter-frame prediction with motion compensation section 23 reads as a predicted value one previous decoded image frame from the frame memory section 24. Then, the difference operating section 25 serves to produce a prediction error signal by taking a difference between the input image frame and the predicted value read from the frame memory 24. The prediction error signal is sent from the difference operating section 25 to the DCT section 26 in which the DCT operation (discrete cosine transformation) is performed about the prediction error signal for transforming the signal into the DCT coefficient. The DCT operation is a kind of orthogonal transformation. The DCT section 26 sends out a DCT coefficient to the quantizing section 27 in which the DCT coefficient is quantized at a proper level, that is, the information is compressed. The quantizing section 27 sends the quantized output to the outside and to the dequantizing section 29 under a control of the encoding control section 28. The dequantizing section 29 serves to perform the dequantizing operation about the quantized signal for picking up the DCT coefficient. Then, the DCT coefficient is sent to the inverse DCT section 30 in which the inverse DCT operation is performed about the DCT coefficient for transforming the DCT coefficient into the prediction error signal. The prediction error signal is added to the prediction error read from the frame memory section 24 in the adder 31. Then, the adding result is stored in the frame memory section 24 and is used for inter-frame prediction of the next image frame.

The above-mentioned known image encoding apparatus is adapted to quantize the DCT coefficient under the proper error allowance for the purpose of reducing the amount of information. Hence, the amount of coding output and the quality of the encoded image are controlled depending on the change of a quantizing step size. The quantizing step size is adjusted on the desired amount of coding output.

As described above, the above-mentioned image encoding apparatus is arranged to quantize the DCT coefficient under certain error allowance for the purpose of reducing the amount of information. It means that the quality degradation of the encoded image results from the quantizing error. Further, the dequantizing section 29 and the inverse DCT section 30 serve to perform the dequantization and the inverse DCT operation about all the encoded output for the purpose of sending the locally decoded signal back to the encoding loop, respectively.

Hence, in a case that the above-mentioned image encoding apparatus is used for image transmission, the encoded output is required to be received on the destination. However, in a case that the information is lost on the communication line, a mismatch takes place between the locally decoded output and the decoded output on the destination. It results in malfunctioning the inter-frame prediction encoding, thereby remarkably degrading the quality of the decoded image.

Further, the above-mentioned image encoding apparatus is incapable of properly adapting to the change of the amount of information contained in the input video signal. That is, in a case that the input image contains an abruptly changing motion, the amount of information contained in the video signal is so abruptly increased that the encoding efficiency is made lower, thereby deteriorating the quality of the encoded image. It is thus difficult to keep the quality of the encoded image constant.

SUMMARY OF THE INVENTION

It is a first object of the present invention to provide an image encoding apparatus which is capable of keeping the quality of the encoded image excellent even though a part of information is lost on the communication line and keeping the quality of the encoded image stable though the amount of information is abruptly increased in the input video signal.

The first object of the present invention can be achieved by an image encoding apparatus which is capable of keeping a quality of an encoded image even though a part of information is lost on a communication line, the apparatus includes a unit for quantizing transform coefficients and for outputting a quantized output signal and a quantized error signal, a unit connected to the quantizing unit for controlling a quantizing level used in the quantizing unit so that the transform coefficients are quantized in accordance with the controlled quantizing level, an error quantizing unit connected to the quantizing unit for quantizing the quantized error signal output from the quantizing unit, and an error encoding control unit connected to the error quantizing unit for controlling a requantizing level used in the error quantizing unit so that the quantized error signal is requantized in accordance with the controlled requantizing level.

In operation, the prediction encoding unit serves prediction encoding of a video signal at each frame based on the input video signal and the video signal of the previous frame read from the frame memory unit and provides a prediction error signal. The prediction error signal is orthogonally transofrmed in the orthogonal transforming unit for obtaining transform coefficients. The resulting transform coefficients are quantized in the quantizing unit. The quantizing level is controlled by the encoding control unit when quantizing the transform coefficients.

The quantizing unit supplies the quantized output outside of the apparatus as an encoding output as well as to the dequantizing unit. The dequantizing unit serves to dequantize the transform coefficients and send the resulting transform coefficients to the inverse orthogonal transforming unit in which the inverse orthogonal transformation is performed about the dequantized transform coefficients for reconstructing the video signal. The reconstructed video signal is stored in the frame memory unit and is used for prediction of the next image frame.

The quantized error supplied from the quantizing unit, on the other hand, is sent to the error quantizing unit. In the error quantizing unit, the quantized error is requantized depending on the quantizing level controlled by the error encoding control unit.

As set forth above, the image encoding apparatus according to the invention provides the error quantizing unit at the next stage of the quantizing unit for the purpose of further quantizing the quantization error in the quantizing unit. The output of the error quantizing unit is not locally decoded as additional information (not returned to the encoding loop). As such, the encoding output is divided into two hierarchies, that is, the output of the quantizing unit sent to the loop and the output of the error quantizing unit.

In a case that the increase of the information amount contained in the input video signal results in degrading the quality of an image in the encoding loop, the quantization of an error keeps the desired quality. On the other hand, in a case that the image encoding apparatus applies to the image transmission, the quantized output in the loop is transmitted to the transmission network in which the information may not be lost. In a case that the information is lost, only the error quantized output is lost. Hence, the lost of the information has no effect on the inter-frame prediction of the encoding loop, resulting in suppressing the degradation of the quality of the encoded image to minimum. The present image encoding apparatus can treat the image information more efficiently and widely so that the apparatus makes contribution to the high-level image information system.

Preferably, the apparatus further includes a prediction encoding unit for encoding a signal at each frame and for outputting a prediction error signal and a transforming unit coupled to the prediction encoding unit and connected to the quantizing unit for orthogonally transforming the prediction error signal output from the prediction encoding unit.

More preferably, the apparatus further includes a dequantizing unit connected to the quantizing unit for dequantizing the quantized output signal output from the quantizing unit and an inverse orthogonal transforming unit connected to the dequantizing unit for performing inverse orthogonal transformation of the transform coefficients dequantized by the dequantizing unit for reproducing the input signal, and a frame memory unit coupled to the inverse orthogonal transforming unit and connected to the prediction encoding unit for storing the signal supplied from the inverse orthogonal transforming unit and for outputting the stored signal so that the stored signal is used for performing a prediction encoding of a next image frame.

Further preferably, the prediction encoding unit is adapted to encode a signal at each frame based on the input signal and the signal stored in the frame memory unit for performing the prediction encoding of the next image frame.

The prediction encoding unit, the transforming unit, the quantizing unit, the dequantizing unit, the inverse transforming unit and the frame memory unit preferably form an encoding loop for performing the prediction encoding of input signals sequentially.

The apparatus further includes a difference operation unit connected to the transforming unit for taking a difference between the input signal and the store signal output from the frame memory unit, preferably.

Preferably, the apparatus further includes an adder connected to both of the inverse transforming unit and the frame memory unit for adding the reproduced signal output from the inverse transforming unit to the signal stored in the frame memory unit.

More preferably, the input signal is a video signal.

It is a second object of the present invention to provide an image decoding apparatus which is capable of reproducing the image transmitted through a communication network from the image encoding apparatus.

The second object of the present invention can be achieved by an image decoding apparatus adapted to be used for an image encoding apparatus which is capable of outputting an encoded signal and an error encoded signal, the apparatus includes a dequantizing unit for dequantizing the encoded signal output from the image encoding apparatus, an inverse transforming unit connected to the dequantizing unit for inverse orthogonal transforming the dequantized signal for reproducing a signal input to the image encoding apparatus, an error dequantizing unit for dequantizing the error encoded signal output from the image encoding apparatus, and an error inverse transforming unit connected to the error dequantizing unit for inverse orthogonal transforming the dequantized error signal output from the error dequantizing unit.

In operation, the dequantizing unit deuantizes the encoded signal output from the image encoding apparatus, the inverse transforming unit connected to the dequantizing unit inverse-transforms the dequantized signal for reproducing a signal input to the image encoding apparatus, an error dequantizing unit dequantizes the error encoded signal output from the image encoding apparatus, and an error inverse transforming unit connected to the error dequantizing unit inverse-transforms the dequantized error signal output from the error dequantizing unit.

Preferably, the image decoding apparatus further includes a frame memory unit for storing an image frame decoded in one previous frame as a predicted value.

The image decoding apparatus further includes a first adding unit connected to the inverse transforming unit for adding the predicted value stored in the frame memory unit to a signal output from the inverse transforming unit, preferably.

The image decoding apparatus further includes preferably a motion compensating unit connected to both of the first adding unit and the frame memory unit for reading the predicted value from the frame memory unit so as to perform the addition of the predicted value stored in the frame memory unit to the signal output from the inverse transforming unit properly.

The image decoding apparatus further includes a second adding unit for adding the reproduced error signal output from the error inverse transforming unit to an output signal from the first adding unit so as to reproduce the input signal input from the image encoding apparatus, preferably.

Further objects and advantages of the present invention will be apparent from the following description of the preferred embodiment of the invention as illustrated in the accompanying drawings.

BRIEF DESCRIPTION OF THE DRAWINGS

FIG. 1 is a block diagram illustrating the principle of an inter-frame prediction with motion compensation orthogonal transform system known by the present inventors;

FIG. 2 composed of FIGS. 2A and 2B is a block diagram showing an arrangement of an image encoding apparatus known to the inventors of the present invention;

DESCRIPTION OF THE PREFERRED EMBODIMENTS

Referring to the accompanying drawings, an embodiment of an image encoding apparatus according to the present invention will be described in the following sections.

Figure 3B:
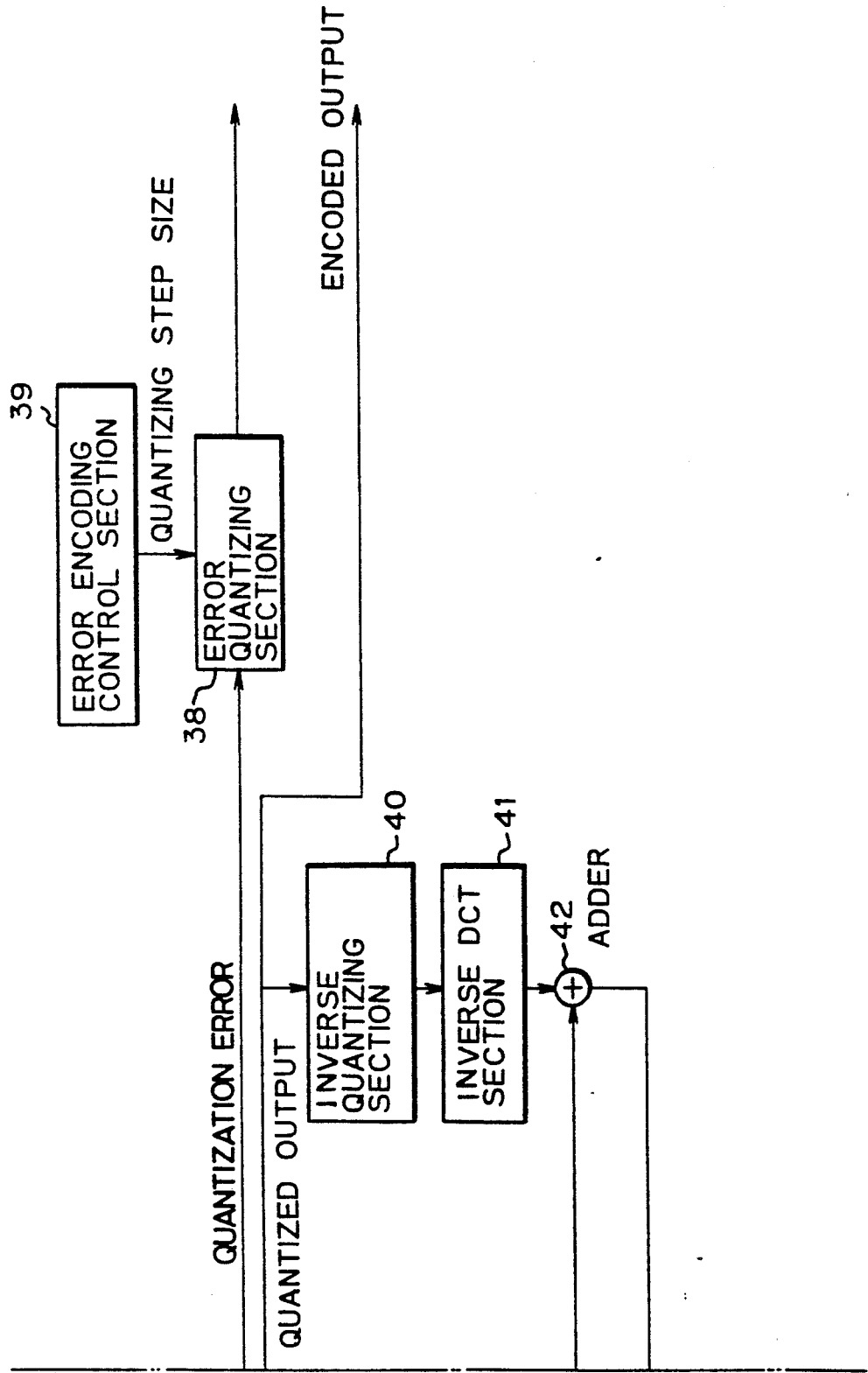
FIG. 3 composed of FIGS. 3A and 3B is a schematic block diagram showing arrangement of an image encoding apparatus according to an embodiment of the present invention.

FIG. 3 composed of FIGS. 3A and 3B is a block diagram showing a schematic arrangement of an image encoding apparatus according to the present invention. As shown, the image encoding apparatus includes a frame memory 32, an inter-frame prediction with motion compensation section 33, a difference operation section 34, a DCT section 35, a quantizing section 36, an encoding control section 37, an error quantizing section 38, an error encoding control section 39, a dequantizing section 40, an inverse DCT section 41 and an adder 42.

An input video signal is led to the difference operation section 34 and the inter-frame prediction with motion compensation section (hereinafter, it is called a prediction section) 33. The prediction section 33 serves to predict with motion compensation between the input video signal at each image frame and the video signal in a frame memory section 32. The difference operation section 34 reads the predicted value from the frame memory section 32 and takes a difference between the input video signal and the predicted value for providing a prediction error signal. The prediction error signal is sent from the difference operation section 34 to a DCT section 35. The DCT section 35 serves to perform a DCT operation (discrete cosine transformation) of the prediction error signal and to supply the resulting DCT coefficients. The DCT operation is a kind of orthogonal transformation. The DCT coefficients are sent to a quantizing section 36 in which it is quantized at a proper level (quantizing step size), that is, the amount of information is compressed. The quantizing section 36 supplies the quantized output to a dequantizing section 40 and a quantizing error to an error quantizing section 38. The dequantizing section 40 serves to dequantize the quantized output for providing the DCT coefficient. The DCT coefficient is sent to an inverse DCT section 41 in which the inverse DCT operation is performed about the DCT coefficient. The inverse DCT section 41 reproduces the video signal from the DCT coefficient. The video signal is sent to an adder 42 in which the predicted value read from the frame memory section 32 is added to the video signal. The adding result is stored in the frame memory section 32 for using the interframe prediction of the next input image frame. As described above and illustrated in FIG. 3, the input video signal travels through a loop (encoding loop) composed of the prediction section 33, the difference operation section 34, the DCT section 35, the quantizing section 36, the dequantizing section 40, the inverse DCT section 41, the adder 42 and the frame memory section 32.

The quantizing section 36 serves to quantize the DCT coefficient under proper error allowance for the purpose of reducing the amount of information. The control of the amount of the coding output and the quality of the encoded image depends on the quantizing step size in the quantizing section 36. The quantizing step size is determined in an encoding control section 37 according to the controlling target such as the amount of coding output. The encoding control section 37 indicates a quantizing step size to the quantizing section 36.

As described above, the quantizing section 36 sends the quantized error to the error quantizing section 38. The error quantizing section 38 is controlled by an error encoding control section 39. In the error quantizing section 38, the quantized error is quantized based on a proper quantizing step size. The proper quantizing step size is smaller than the quantizing step size which is applied in the quantizing section 36.

The quantizing step size is indicated by the error encoding control section 39. That is, the error quantizing section 38 is controlled independently of the quantizing section 36 which composes the part of the encoding loop.

Figure 4:
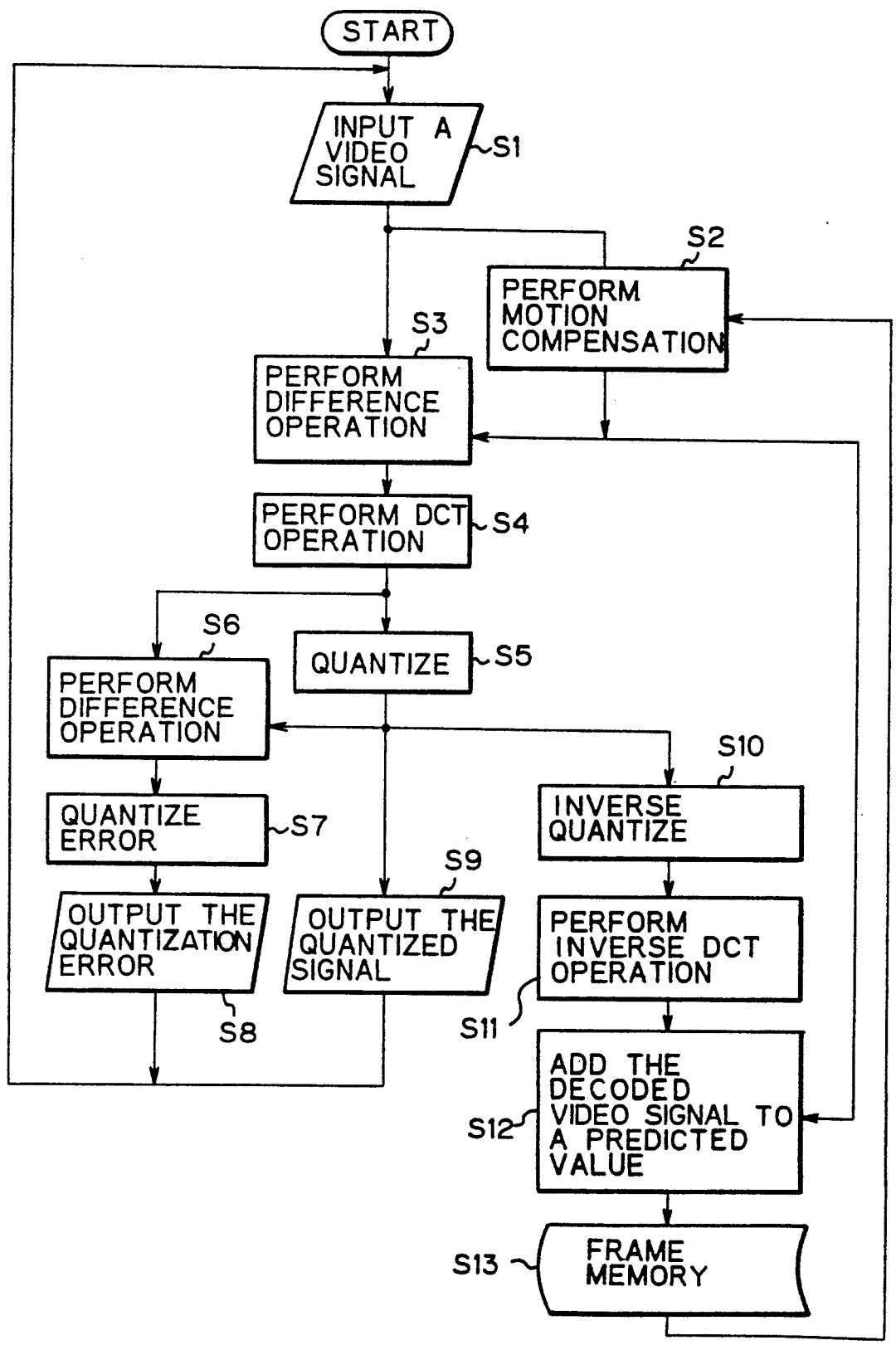
FIG. 4 is a flowchart illustrating the operation of the image encoding system according to the embodiment of the present invention.

FIG. 4 is a flowchart illustrating the operation of the image encoding apparatus according to the present invention.

A video signal is input to the image encoding apparatus (Step S1). The motion compensation is carried out between the video signal and the video signal decoded as the previous frame (Step S2). At step S3, the difference is taken between the video signal obtained as a result of motion compensation and the input video signal. Then, the DCT operation is performed about the difference, that is, the prediction error signal so as to transform the prediction error signal into a DCT coefficient (Step S4). Then, the DCT coefficient is quantized (Step S5). The quantized output is sent to the outside as an encoded result (Step S9). The difference is taken between the DCT coefficient (Step S6) and the quantized output for deriving a quantized error (Step S7). The difference is quantized again so as to provide the quantized error (Step S8). On the other hand, the quantized output is dequantized (Step S10) for deriving the DCT coefficient. The resulting DCT coefficient is reproduced into the video signal based on the inverse DCT operation (Step S11). Then, the video signal is added to the predicted value (Step S12) and the adding result is stored in the frame memory (Step S13).

Figure 5B:
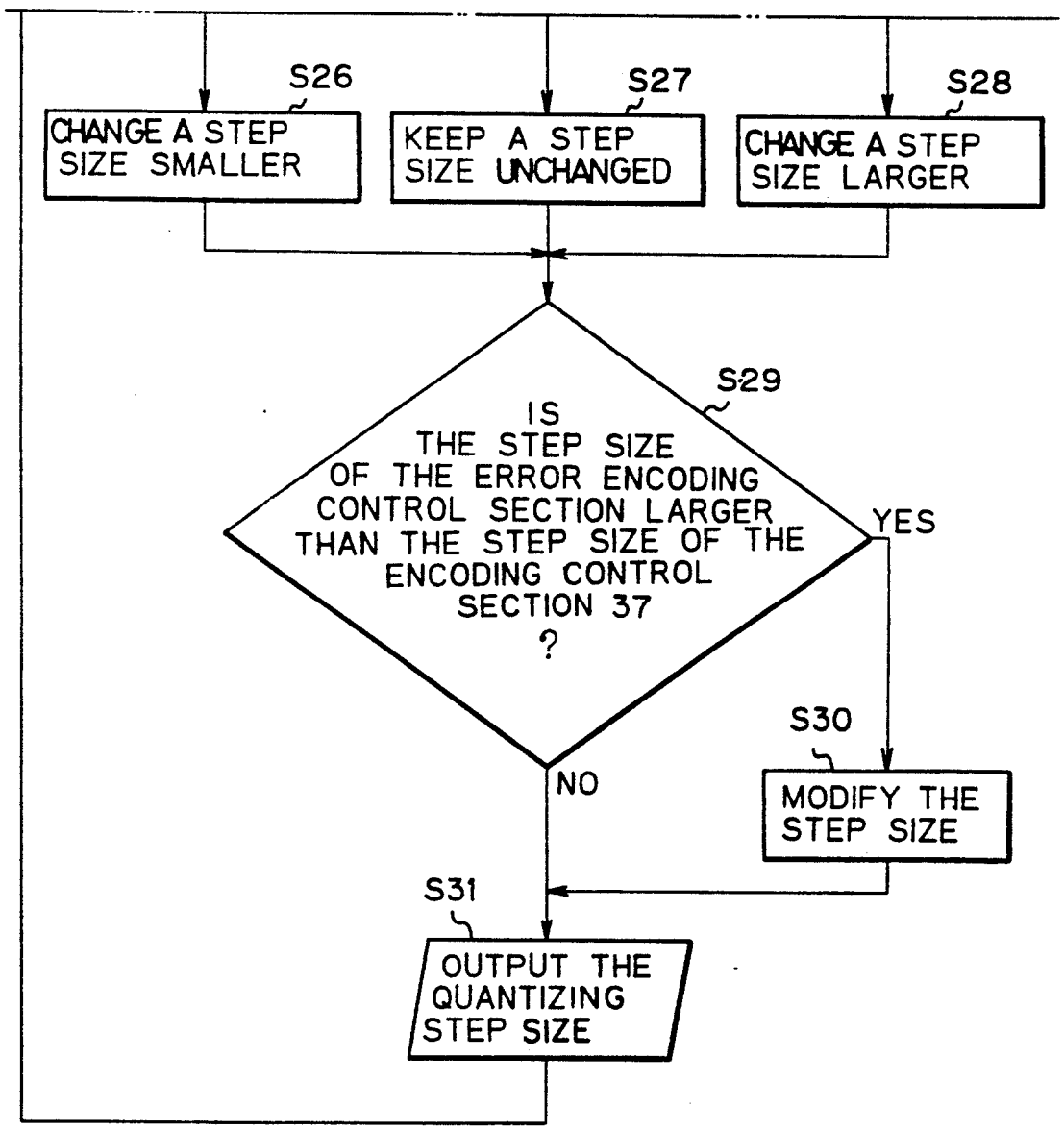
FIG. 5 composed of FIGS. 5A and 5B is a flowchart illustrating the operation of the error encoding control section included in the embodiment of the present invention.

FIG. 5 composed of FIGS. 5A and 5B is a flowchart illustrating the operation of the error encoding control section 39 shown in FIG. 3. With reference to FIG. 3, the description will be directed to the error encoding control section 39 operating to suppress the variation of the quality of encoded image.

To keep the image quality constant, it is well known that the quantizing step size is fixed at a predetermined value. However, the relation among the desired image quality and amount of coding output and the quantizing step size depending on the kind and the nature of the input video signal. Hence, it is impossible to define a proper quantizing step size in advance.

Actually, it is necessary to control the quantizing step size as checking the encoding state. For the purpose, it is considered that the encoding states are accumulated over a sufficiently long time so as to allow the average value to come closer to the target value. It results in allowing the local variation of the information amount and achieving the target value as a whole. The error encoding control section 39 serves to monitor the encoding state, in particular, the code amount of the error quantized output for each one image frame (Steps S21 and S22). The code amount of the error quantized output is accumulated at each frame (Step S23) and averaged (Step S24). Then, it is determined whether or not the average code amount is larger than the target code amount (Step S28). If yes, the quantizing step size is made larger (Step S28). If no, the quantizing step size is made smaller (Step S26). If both of the values are equal, the quantizing step size is kept as same value (Step S27). The obtained quantizing step size is compared with the quantizing step size given in the encoding control section 37 (Step S29) so that the former should be kept smaller than the latter (Step S30). In a case that the former is larger than the latter, the error quantizing becomes meaningless. Then, the error encoding control section 39 outputs the proper quantizing step. Basically, the error encoding control section 39 is operated independently of the encoding control section 37 so that the error encoding control section 39 defines the quantizing step size for the error quantizing section 38 and the encoding control section 37 defines the quantizing step size for the quantizing section 36, respectively.

Figure 6:
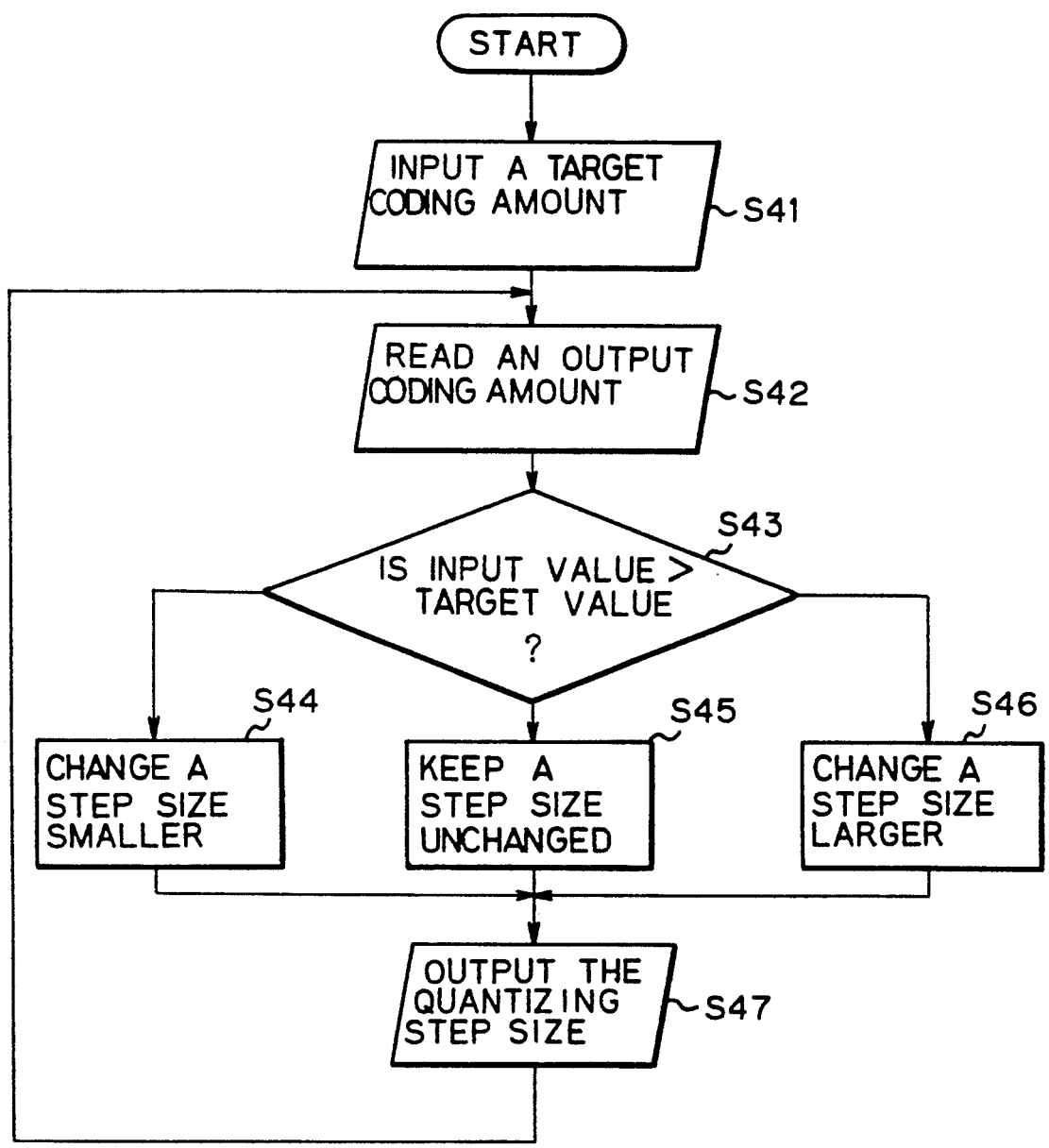
FIG. 6 is a flowchart illustrating the operation of the encoding control section assuming that the amount of coding output are unchanged.

FIG. 6 is a flowchart illustrating the operation of the encoding control section 37 for keeping the amount of output codes constant. As shown, the encoding control section 37 reads the amount of codes in the quantized output (Step S42) and directly compares the actual value with the target value (Step S43). Depending on the compared results (Steps S44 to S46), the quantizing step size is defined (Step S47).

Figure 7:
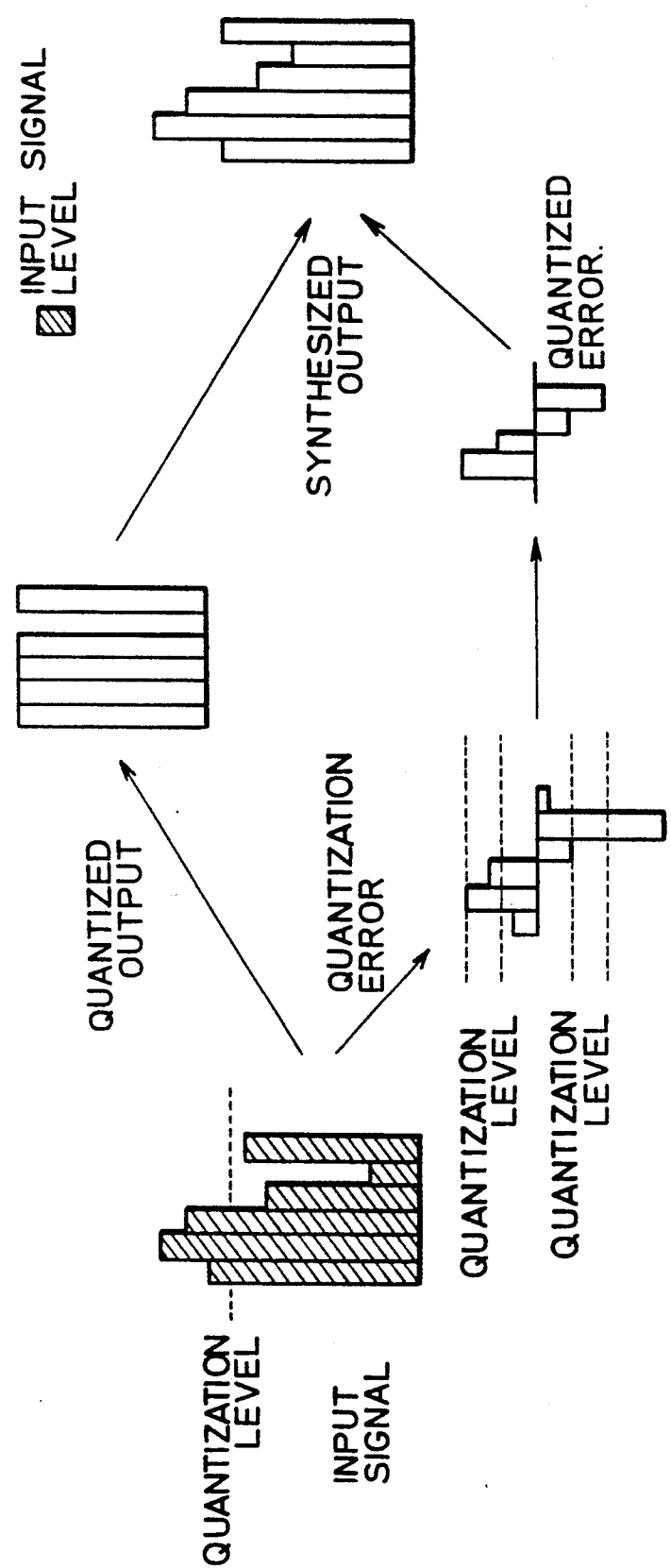
FIG. 7 is a view showing the further quantizing process of a quantized error in the embodiment of the present invention.

FIG. 7 illustrates a method of quantizing a quantizing error. When the input signal is quantized in the quantizing section 36 at a proper quantizing level, the quantized output contains an error. Thus, the quantized error is picked out and is further quantized at a smaller quantizing level than the former level. This is because the synthesized output of the original quantized output and the quantized error has a smaller difference of an original input signal than the quantized output without any quantized error.

Figure 8:
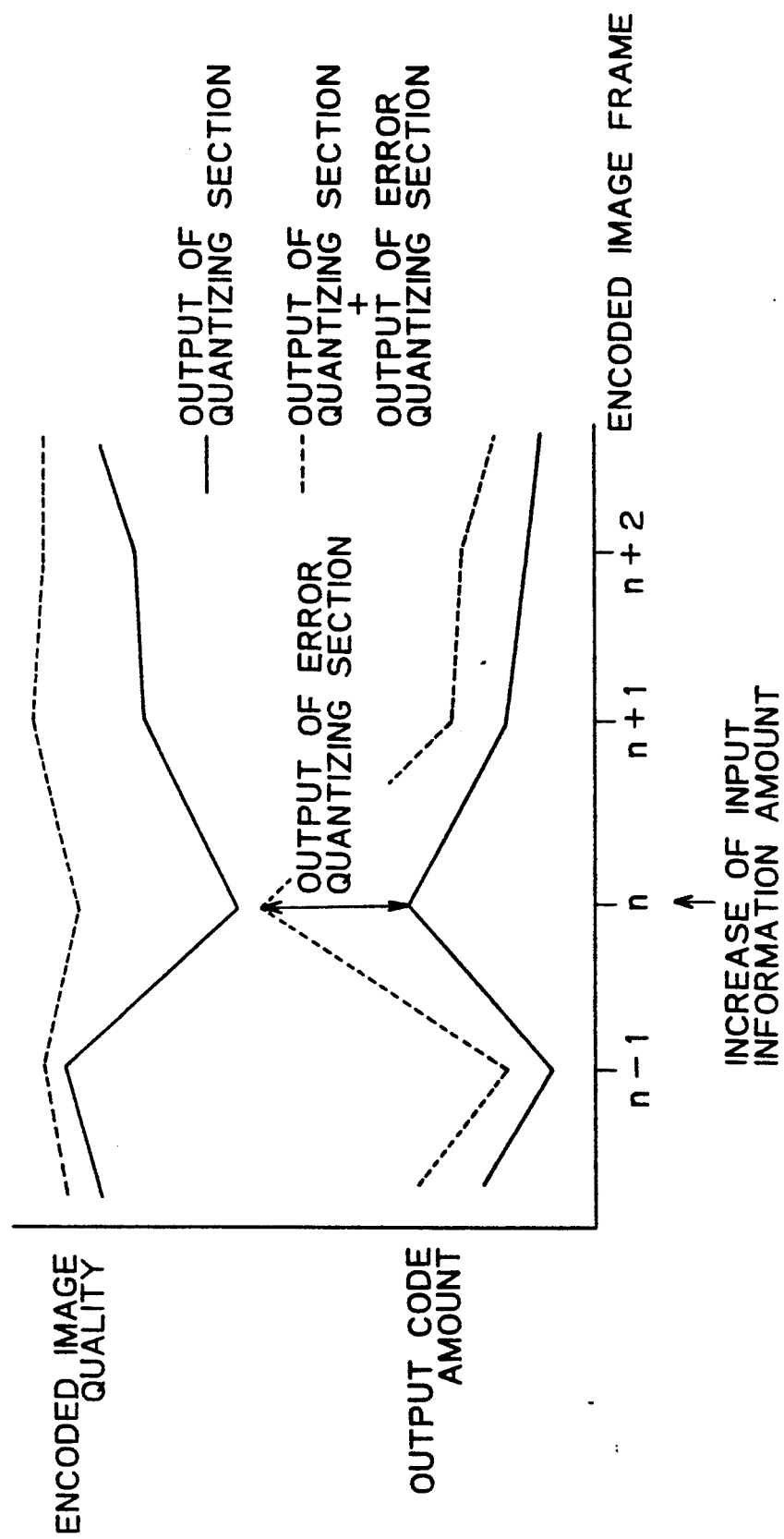
FIG. 8 is a graph showing the change of the amount of coding output in the embodiment of the present invention.

FIG. 8 is a graph showing a change of the amount of coding output. In the FIG. 8, the encoding control section 37 serves to keep the amount of output codes constant and the error encoding control section 39 serves to keep the image quality constant independently of the encoding control section 37. Assume that the amount of information is abruptly increased at an n-th image frame to be encoded. The amount of output information (amount of output codes) of the quantizing section 36 does not follow the increase of the amount of the input information, resulting in degrading the quality of the encoded image as shown in a real line of FIG. 8. This is because the difference between the amount of input information and the amount of output codes becomes a quantized error in the quantizing section 36. Hence, as the amount of information output from the error quantizing section 38 increases, the output of the error quantizing section 38 contributes to prevent the degradation of the quality of the encoded image as shown by a broken line of FIG. 8 from a whole point of view (the output of the quantizing section 36+the output of the error quantizing section 38).

In turn, the description will be directed to the operation of the image encoding apparatus assuming that the amount of information contained in the input video signal is increased by the abrupt motion caused in the video signal, for example. In this assumption, the encoding control section 37 serves to suppress increase of the amount of codes, because the amount of the output codes is increased if the image encoding apparatus continues to encode the video signal in same encoding condition. That is, the encoding control section 37 indicates a larger quantizing step size to the quantizing section 36 so as to reduce the amount of information. Hence, as the quantizing error is increased in the quantizing section 36, it results in degrading the quality of the encoded image in the quantized output of the quantizing section 36.

The error encoding control section 39, however, serves to keep the image quality constant independently of the encoding control section 37. Hence, the error encoding control section 39 keeps the quantizing step size to be indicated to the error quantizing section 38. The increased quantized error is again quantized in the error quantizing section 38 so that the amount of the output codes from the error quantizing section 38 is increased. The increase compensates for the degradation of the image quality at the output of the quantizing section 36, resulting in keeping the quality of the encoded image constant from a whole point of view.

In turn, the description will be directed to the image encoding apparatus applied to a transmission network where the information may be lost. The information encoded in the image encoding apparatus can be divided into two hierarchical outputs, that is, the output of the quantizing section 36 and the output of the error quantizing section 38. Assuming that the higher priority is given to the output of the quantizing section 36 at a time when the data is transmitted, the output of the error quantizing section 38 which has lower priority is selectively lost in a case that the information is lost. It results in eliminating the loss of the information given on the locally decoded output, that is, the inter-frame prediction.

Therefore, in a case that the information may be lost, the present image encoding apparatus can make sure of keeping the quality of the encoded image at the minimum level assured when the foregoing known image encoding apparatus is applied to the transmission network where no information may be lost.

Figure 9:
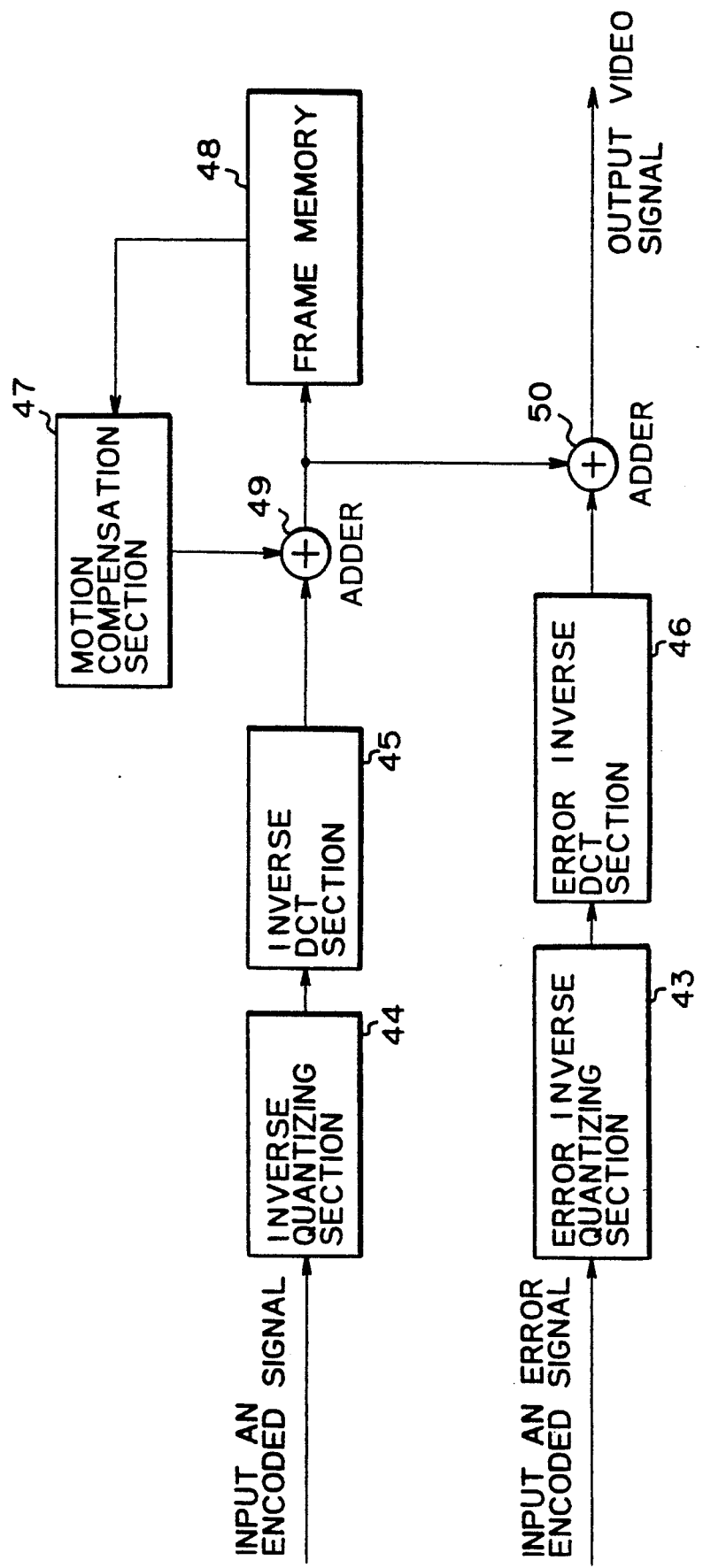
FIG. 9 is a block diagram showing arrangement of a receiving side of the image encoding apparatus according to the present invention.
Figure 10:
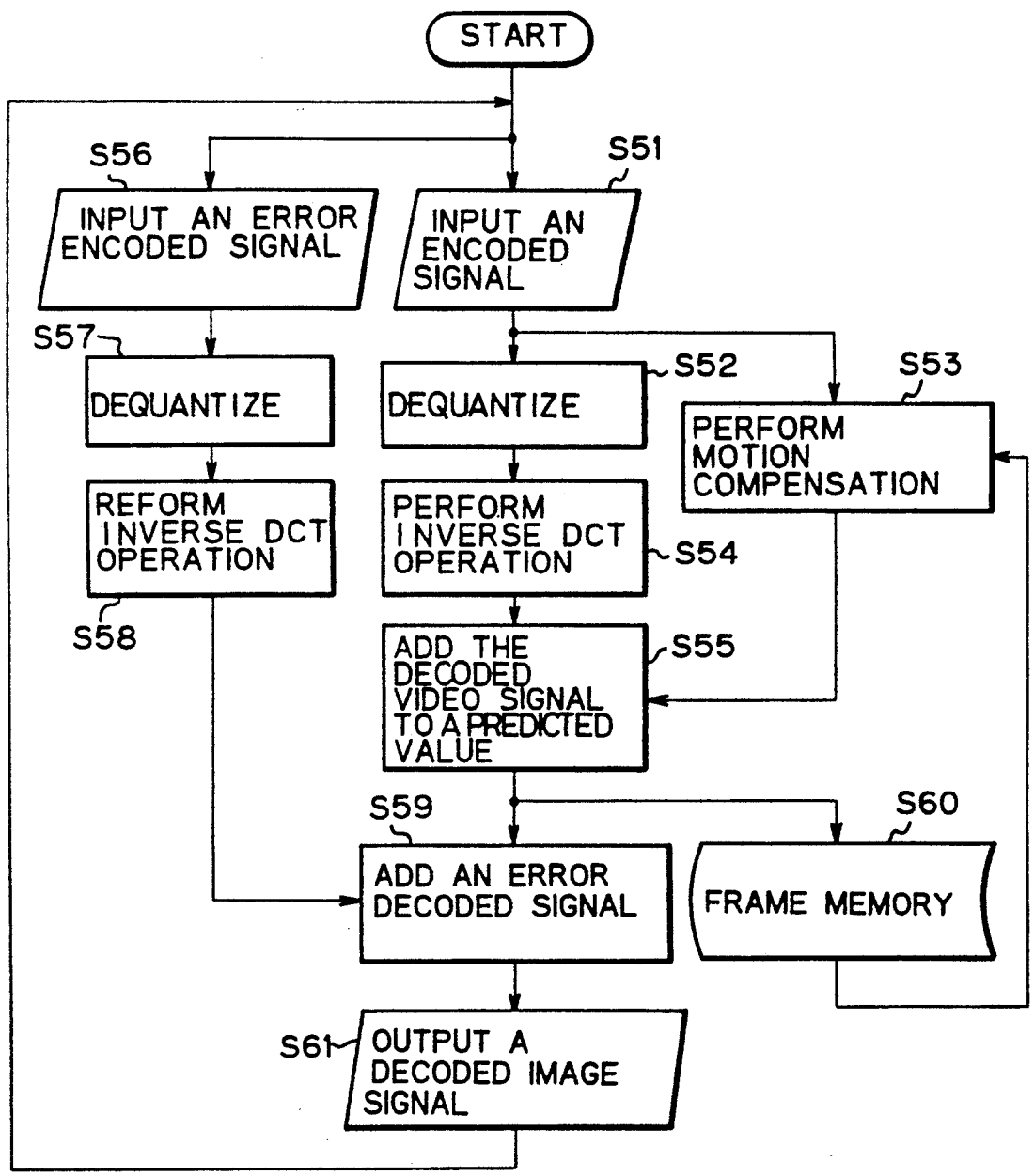
FIG. 10 is a flowchart illustrating the operation of the receiving side of the image encoding apparatus shown in FIG. 8.

In turn, the description will be directed to the receiving side of the image encoding apparatus with reference to FIGS. 9 and 10.

FIG. 9 illustrates a schematic block diagram showing an embodiment of an image decoding apparatus as the receiving side of the image encoding apparatus.

As shown in FIG. 9, the image decoding apparatus includes an error dequantizing section, a dequantizing section 44, an inverse DCT section 45, an error inverse DCT section 46, a motion compensation section 47, a frame memory 48, an adder 49, and an adder 50.

FIG. 10 is a flowchart illustrating the operation of the image decoding apparatus shown in FIG. 9.

As shown in FIG. 9, the image decoding apparatus receives the encoded signal and the error encoded signal which respectively correspond to the quantized output and the error quantized output. The encoded signal is input to the dequantizing section 44 and the error encoded signal is input to the error dequantizing section 43. The dequantizing section 44 serves to dequantize the encoded signal and supply a DCT coefficient to the inverse DCT section 45 in which the inverse DCT operation is performed about the DCT coefficient. Like the transmitting side, the motion compensating section 47 reads as a predicted value an image frame decoded at one previous frame from the frame memory 48. The adder 49 serves to add the predicted value to the output of the inverse DCT section 45 for the purpose of reconstructing a video signal. The video signal is stored in the frame memory section 48 and is used as a predicted value for decoding the next image frame. On the other hand, the error dequantizing section 43 serves to dequantize the error encoded signal and supply the dequantized output to the error inverse DCT section 46 in which the inverse DCT operation is performed about the dequantized output for reconstructing a video signal. The error inverse DCT section 46 supplies the video signal to the adder 50 in which the video signal from the adder 49 is added to the video signal reproduced by the error inverse DCT section 46. The adding result is output as a final reproduced video signal.

With reference to FIG. 10, the operation of the image decoding apparatus on the receiving side will be described as follows.

At first, the input error encoded signal and the encoded signal are respectively input (Steps S56 and S51) and dequantized (Steps S57 and S52). The dequantized results, that is, the DCT coefficients are respectively inverse transformed into the original video signals (Steps S58 and S54). On the other hand, the same portion as the video signal obtained as a result of motion compensation on the transmitting side is read as a predicted value from the video signal decoded and stored in one previous frame (Step S53). The information indicating the reading position (motion vector) is transmitted as side information from the transmitting side to the receiving side. Then, the predicted value is added to the output of the inverse DCT operation, that is, the reproduced prediction error signal (Step S55) so as to reconstruct the video signal. The reconstructed video signal is stored in the frame memory 48 (Step S60) so that it is used for the decoding next frame. The video signal is added to the video signal obtained by the inverse DCT operation done about the error encoding signal. The adding result is output as a reproduced image signal to the outside.

The non-use of the error encoded signal results in achieving the same arrangement of the known image encoding apparatus so that the receiving side can receive and decode the signal sent from the known image encoding apparatus. The tolerance to the loss of information on the transmission network described with respect to the transmitting side is true to the receiving side. The error encoded signal is not used for the interframe prediction so that it can be freely treated at a time when a process of decoding the signal is performed. The error encoded signal is effective in improving the quality of an image on the receiving side.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image encoding apparatus which is capable of keeping a quality of an encoded image even though a part of information is lost on a communication line, said apparatus comprising:
   a quantizing means for quantizing transform coefficients and for outputting a quantized output signal and a quantized error signal;
   an error quantizing means connected to said quantizing means for quantizing said quantized error signal output from said quantizing means;
   a prediction encoding means for encoding an input signal at each frame and for outputting a prediction error signal;
   a transforming means coupled to said prediction encoding means and connected to said quantizing means for orthogonally transforming said prediction error signal output from said prediction encoding means;
   a dequantizing means connected to said quantizing means for dequantizing said quantized output signal from said quantizing means and for outputting transform coefficients produced by dequantizing said quantized output signal;
   an inverse orthogonal transforming means connected to said dequantizing means for performing inverse orthogonal transformation of said transform coefficients dequantized by said dequantizing means so as to reproduce a signal corresponding to said input signal;
   a frame memory means coupled to said inverse orthogonal transforming means and connected to said prediction encoding means for storing said signal supplied from said inverse orthogonal transforming means; and
   a difference operation means connected to said transforming means for taking a difference between said input signal and said stored signal output from said frame memory means so as to obtain prediction errors as values of said transform coefficients transformed orthogonally.

2. An image encoding apparatus according to claim 1, wherein said apparatus further comprises an adder connected to both of said inverse orthogonal transforming means and said frame memory means for adding said reproduced signal output from said inverse orthogonal transforming means to said signal stored in said frame memory means.

3. An image encoding apparatus according to claim 2, wherein said apparatus further comprises:
   means connected to said quantizing means for controlling a quantizing level used in said quantizing means so that said transform coefficients are quantized in accordance with said controlled quantizing level; and
   an error encoding control means connected to said error quantizing means for controlling a requantizing level used in said error quantizing means so that said quantized error signal is requantized in accordance with said controlled requantizing level.

4. An image encoding apparatus according to claim 1, wherein said prediction encoding means is adapted to encode a signal at each frame based on said input signal and said signal stored in said frame memory means for performing said prediction encoding of a next image frame.

5. An image encoding apparatus according to claim 4, wherein said prediction encoding means, said transforming means, said quantizing means, said dequantizing means, said inverse orthogonal transforming means and said frame memory means form an encoding loop for performing said prediction encoding of input signals sequentially.

6. An image encoding apparatus according to claim 1, wherein said input signal is a video signal.

7. An image decoding apparatus adapted to be used for an image encoding apparatus which is capable of outputting an encoded signal and an error encoded signal, said apparatus comprising:
   a dequantizing means for dequantizing an encoded signal output from said image encoding apparatus;
   an inverse orthogonal transforming means connected to said dequantizing means for inverse orthogonal transforming said dequantized signal output from said dequantizing means for reproducing a signal input to said image encoding apparatus;
   an error dequantizing means for dequantizing said error encoded signal output from said image encoding apparatus; and
   an error inverse orthogonal transforming means connected to said error dequantizing means for inverse orthogonal transforming said dequantized error signal output from said error dequantizing means.

8. An image decoding apparatus according to claim 7, wherein said apparatus further comprises a frame memory means for storing an image frame decoded in one previous frame as a predicted value, and a first adding means connected to said inverse orthogonal transforming means for adding said predicted value stored in said frame memory means to a signal output from said inverse orthogonal transforming means.

9. An image decoding apparatus according to claim 8, wherein said apparatus further comprises a motion compensating means connected to both of said first adding means and said frame memory means so as to properly perform said addition of said predicted value stored in said frame memory means to said signal output from said inverse orthogonal transforming means.

10. An image decoding apparatus according to claim 9, wherein said apparatus further comprises a second adding means for adding said reproduced error signal output from said error inverse orthogonal transforming means to an output signal from said first adding means so as to reproduce said input signal from said image encoding apparatus.

11. An image decoding apparatus according to claim 7, wherein said input signal is a video signal.

* * * * *